United States Patent Office 3,232,868
Patented Feb. 1, 1966

3,232,868
WATER-REFINING AGENTS AND PROCESS EMPLOYING SAME
Paul Flachsenberg and Josef Wuhrer, Wulfrath, Germany, assignors to Dolomitwerke G.m.b.H., Wulfrath, Rhineland, Germany, a corporation of Germany
No Drawing. Filed Aug. 11, 1961, Ser. No. 130,752
Claims priority, application Germany, Aug. 25, 1960, D 34,098
10 Claims. (Cl. 210—59)

This invention relates to processes for the purification or refining of water and makes it possible to carry out such processes by means of appropriate water refining agents and materials.

In order to prevent the corrosion of the iron pipe lines and tanks, containers, and vessels used for flowing and storing drinking and utility water, there must be removed therefrom the active carbonic acid contained therein up to the attainment of the lime-carbonic acid equilibrium. As agents for this purpose, it is well known to employ completely deacidified and also semi-burnt dolomite. In completely deacidified dolomite, the magnesium carbonate and the calcium carbonate are completely converted into their corresponding oxides. However, in the semi-burnt dolomite only the magnesium carbonate is converted to magnesium oxide. The calcium-carbonate however is still present as such. Both of these agents are employed in their granular form as filtering layers or zones in the treatment of water to be purified.

It has been shown that completely acidified dolomite is not suitable for use as a water purifying agent since only after very short periods it becomes hydrated wherein, in particular, through the hydration of the burnt lime the granular product decomposes and the filter rapidly clogs up. The semi-burnt dolomite does not undergo a granular decomposition and therefore this product is frequently employed as a water refining agent. Conventionally, the semi-burnt dolomite is utilized in a narrowly classified range of grain sizes and, in particular, in a size range of between 0.5 and 6 mm. in open and closed filter installations. That part of the agent consumed by the carbonic acid present in the water being treated is replaced from time to time.

There are also known water refining agents for use in the deacidification, alkalization, neutralization, etc., of water formed as solids which are produced from random or arbitrary mixtures of magnesium oxide or hydroxide with calcium oxide or hydroxide and which after drying are treated with gases and, in particular, with carbon dioxide gas in order to form insoluble calcium salts. It is also known in the production of these water refining agents to increase their porosity through addition thereto of gas or foam generating materials or mechanically acting filler or lean materials.

In accordance with the invention it has now been found that by stabilizing the sintered dolomite, an agent for use in the purification of water is obtained which removes substantially more rapidly, more efficiently, and economically the active carbonic acid contained in the water than the hitherto known conventionally used water purification agents.

In accordance with the invention the water refining agent consists of sintered dolomite stabilized with silicic acid. It constitutes a material of which the CaO content is, for the purpose of obtaining complete water stability, chemically bound through the addition of silicic acid. In this water refining agent the CaO is advantageously present as tri-calcium silicate; however, it may also be present as di-calcium silicate or as a mixture of both. The MgO is, however, not bound by the silicic acid. Certain portions of the CaO may be bound to accompanying substances such as $Al_2O_3$ and $Fe_2O_3$ originating in the raw materials. In addition, small amounts of CaO may be present as free CaO, the latter being harmless as long as the water stability of the overall product is assured, that is normally 1–4% CaO.

The stabilization of the sintered dolomite results in that the consumption of the sintered dolomite in operation is markedly decreased—i.e., a product having a substantially increased life span results. In accordance with the invention, the dolomite is stabilized by addition thereto of $SiO_2$ or silicates capable of binding CaO to di- or tricalcium silicates, the sintering being carried out with the mixture.

In accordance with the invention the sintered dolomite stabilized with silicic acid is produced from crude dolomite, by addition thereto of silicic acid, e.g. in the form of quartz sand, serpentine, talcum or other silicates as for example of magnesia, lime-magnesia or lime the latter being substantially pure materials and burning of the admixture at temperatures above 1500° C. By using silicates of magnesium or calcium (e.g. serpentine, talcum) the sintering can be accelerated or the sintering temperature can be lowered; moreover the using of magnesium silicates renders it possible to increase the magnesium content of the sintered product. The stabilized sintered dolomite in accordance with the invention contains at least 15 to 17% silicic acid, where the CaO is chemically bound as tricalcium silicate, and, in those instances where the CaO is present essentially as dicalcium silicate, the $SiO_2$ content of the stabilized sintered product increases to about 22 to 25%.

In accordance with the invention it has furthermore been found that the effectiveness of application as water purification agent is increased even further if the refining agent consists of hydraulically bound, stabilized sintered dolomite. The hydraulically bound product is obtained by fine grinding of the stabilized sintered dolomite followed by formation of a paste under addition of water and subsequent granulation.

By the term "hydraulically set or hardened" is meant the setting or hardening of the dolomite under water (see Chambers Technical Dictionary, revised edition; Macmillan Co., New York, 1961; Hackh's Chemical Dictionary, 3rd edition; Blakiston Co., Philadelphia 1946). In accordance with the invention water is added to the finely divided stabilized sintered dolomite and the resulting paste is allowed to harden or set. The set product is thereafter granulated.

An agent with an even greater effectiveness and life span is produced by addition to the paste just described of a gas or foam-forming material as, for example, by adding to the paste an aluminum-, magnesium- or calcium-carbide powder or a foaming agent, e.g. a derivative of sulfonic acid and naphthalene and thereafter this product is permitted to hydraulically become bound and set.

The products thus produced, namely, the stabilized sintered product, the hydraulically bound sintered product or the porous hydraulically bound sintered product is used in a narrowly classified range of granulation sizes, as, for example, 0.5 to 1.5 mm., 1.5 to 3 mm., 3 to 4.5 mm., etc., as the filtering layer or zone for the deacidification of drinking and utility water. The overall broad range of these grain sizes lies between about 0.2 and 15 mm., and preferably between 0.5 and 6 mm.

The advantages of the dolomite products, in accordance with the invention, as against the known conventional agents are the lower consumption thereof in practice and their substantially increased effect in removal of the active carbonic acid content in the water. By the use of these agents it becomes possible to increase the filtering capacity where the same amounts of refining agent are charged, or, alternatively, to achieve the same filtering capacity with a lesser amount of agent than heretofore required.

The refining may, of course, be carried out under the use of any of the agents herein disclosed per se or in admixture with one another and even to a considerable practicable advantage in admixture with conventional and known water refining agents.

*Examples*

The following examples further illustrate processes of practising the invention and the results thereby obtained and are not to be construed as in any way limiting the invention. Into each of six glass tubes having a length of 150 cm. and a through diameter of 4 cm., there is introduced following filling with a 4 cm. high gravel or sand layer having a grain size of 3–5 mm. and serving as a supporting layer, 1000 g. of one of the following filtering masses having a grain size of 0.5–2 mm. produced as hereinafter set out.

(1) *Semi-burnt dolomite.*—The weight per liter of this fraction is equal to 1100 g.

(2) Magnesium-hydroxide and calcium-hydroxide in a mol ratio of 1:1 admixed with water and molded to form a product having a grain size of 0.5–2 mm. and in which thereafter the calcium-hydroxide is carbonated with carbon dioxide. The weight per liter of this fraction is equal to 1075 g.

(3) Stabilized sinter, produced from crude dolomite, and as much quartz sand that the calcium oxide present is essentially bound as tricalcium silicate ($3CaO.SiO_2$), that is e.g. at 91.4 weight percentage crude dolomite (31.5% CaO, 20.3% MgO, 47.1% $CO_2$, 0.4% $SiO_2$, 0.3% $Al_2O_3$, 0.5% $Fe_2O_3$) and 8.6 weight percentage quartz sand. Both the crude dolomite and sand are ground in admixture so as to give a 6% residue on the 4900 mesh sieve and the mixture thereafter sintered in a rotary furnace at 1700° C. The sintered mass is comminuted and a fraction of a grain size of 0.5–2 mm. screened off. The weight per liter of this fraction is equal to 1410 g. The chemical composition is as follows:

| | Percent |
|---|---|
| Loss on ignition | 0.8 |
| $SiO_2$ | 15.6 |
| $Fe_2O_3$ | 1.2 |
| $Al_2O_3$ | 1.4 |
| CaO | [1]49.2 |
| MgO | 31.3 |

[1] Of which unbound calcium=3.8%.

(4) Stabilized sinter according to (3) ground to a 10% residue on the 4900 mesh sieve is treated with 30 weight percent of water to form a paste which is thereafter hydraulically hardened in a mold. After 10 days in a mold, the body is comminuted and the fraction having a grain size of 0.5–2 mm. screened off. The weight per liter of this fraction is equal to 985 g.

(5a) Stabilized sinter according to (3), ground to a 10% residue on the 4900 mesh sieve, is stirred with 33 weight percent of water and 0.6% of an aluminum powder to form a paste, which is poured into a mold in which formation of gas pores and hydraulic hardening takes place. After 10 days the hard porous body is comminuted and a fraction having a grain size of 0.5–2 mm. prepared. The weight per liter of this fraction is equal to 670 g.

(5b) Stabilized sinter according to (3), ground to a 10% residue on the 4900 mesh sieve, is stirred with 33 weight percent of water and 1% of the sodium sulfonic acid of naphthalene to form a foam, which is poured into a mold in which formation of gas pores and hydraulic hardening takes place. After 10 days the hard porous body is comminuted and a fraction having a grain size of 0.5–2 mm. prepared.

(6) Stabilized sinter which as in (3) above is produced from crude dolomite and quartz sand, but in this instance utilizing the ratio of dolomite to sand, resulting in a sintered product in which the CaO is essentially bound as dicalcium silicate ($2CaO.SiO_2$), e.g. 86.6 weight percent crude dolomite, 13.4 weight percent quartz. The sinter product is produced by burning at about 1650° C. and the product is thereafter comminuted and screened to form a product having a grain size of 0.5–2 mm. The weight per liter of this fraction is equal to 1390 g. The chemical composition thereof is as follows:

| | Percent |
|---|---|
| Loss on ignition | 0.2 |
| $SiO_2$ | 23.2 |
| $Fe_2O_3$ | 1.4 |
| $Al_2O_3$ | 0.9 |
| CaO | [1]45.4 |
| MgO | 28.9 |

[1] No uncombined CaO present.

1000 g. of one of the above said six samples is filled into one of the six glass tubes containing a gravel supporting layer as above set out and thereafter 5 liters per hour of unrefined water containing 35–45 mg. per liter of active $CO_2$ is charged through the tube. The test is carried out over several months during which period the filter material is frequently rinsed out and the filter material brought up to its original level. The content of $CO_2$ in the pure water in each of the runs is shown in the following table (average values being reported):

| Refining Agent | Mg. $CO_2$/liter Pure Water |
|---|---|
| 1. Semi-burnt dolomite | 4–8 |
| 2. Magnesium- and calcium-hydroxide, treated with carbonic acid, according to Example 2 | 3.5–7 |
| 3. Stabilized sinter according to Example 3 ($3CaO.SiO_2$) | 2–6 |
| 4. Stabilized sinter according to Example 3, hydraulically bound | 2–4 |
| 5a+5b. Stabilized sinter according to Example 3, hydraulically bound, porous | 1–2 |
| 6. Stabilized sinter according to Example 6 ($2CaO.SiO_2$) | 2–6 |

The consumption of agent after equal running times when compared with the known agents is, in the case of the stabilized sinter products (runs 3 and 6), only 75% and in the case of the hydraulically bound stabilized sinter products (runs 4 and 5) only 65%.

We claim:

1. A water refining agent consisting essentially of a silica stabilized sintered dolomite, the CaO content of which is substantially completely chemically bound as a member selected from the group consisting of dicalcium silicate, tricalcium silicate and mixtures thereof prepared by heating crude dolomite containing as an inherent impurity $Al_2O_3$ and $Fe_2O_3$ in an amount of less than 1% by weight and silica to a temperature above about 1500° C., the silica being present in said sintered product in an amount of from 15 to 17% where the CaO is present chemically bound as tricalcium silicate and in an amount of about 22 to 25% where the CaO present is essentially bound as dicalcium silicate.

2. A water refining agent consisting essentially of a hydraulically hardened silica stabilized sintered dolomite, the CaO content of which is substantially completely chemically bound as a member selected from the group consisting of dicalcium silicate, tricalcium silicate and mixtures thereof prepared by heating crude dolomite containing as an inherent impurity $Al_2O_3$ and $Fe_2O_3$ in an amount of less than 1% by weight and silica to a temperature above about 1500° C., the silica being present in said sintered product in an amount of from 15 to 17% where the CaO is present chemically bound as tri-calcium silicate and in an amount of about 22 to 25% where the CaO present is essentially bound as dicalcium silicate, and thereafter subjecting said stabilized sintered dolomite to treatment with water to hydraulically harden the same.

3. A water refining agent consisting essentially of a hydraulically hardened porous silica stabilized sintered dolomite, the CaO content of which is substantially completely chemically bound as a member selected from the group consisting of dicalcium silicate, tricalcium silicate and mixtures thereof prepared by heating crude dolomite containing as an inherent impurity $Al_2O_3$ and $Fe_2O_3$ in an amount of less than 1% by weight and silica to a temperature above about 1500° C., the silica being present in said sintered product in an amount of from 15 to 17% where the CaO is present chemically bound as tri-calcium silicate and in an amount of about 22 to 25% where the CaO present is essentially bound as di-calcium silicate, and adding to the water treated product a pore forming agent.

4. A water refining agent according to claim 3 in particle form, said particles having a size of 0.2 to 15 mm.

5. A water refining agent consisting essentially of a silica stabilized sintered dolomite in which substantially all of the CaO content is chemically bound as tricalcium silicate in particle form, said particles having a size of from about 0.5 to 6 mm. prepared by heating crude dolomite containing as an inherent impurity $Al_2O_3$ and $Fe_2O_3$ in an amount of less than 1% by weight and silica to a temperature above about 1500° C., the silica being present in said sintered product in an amount of from 15 to 17%.

6. A water refining agent consisting essentially of a hydraulically hardened silica stabilized sintered dolomite in which substantially all of the CaO content is chemically bound as tri-calcium silicate in particle form, said particles having a size of from about 0.5 to 6 mm. prepared by heating crude dolomite containing as an inherent impurity $Al_2O_3$ and $Fe_2O_3$ in an amount of less than 1% by weight and silica to a temperature above about 1500° C., the silica being present in said sintered product in an amount of from 15 to 17%, and subjecting said stabilized sintered dolomite to treatment with water to hydraulically harden the same.

7. A water refining agent consisting essentially of a porous hydraulically hardened silica stabilized sintered dolomite in which substantially all of the CaO content is chemically bound as tri-calcium silicate in particle form, said particles having a size of from about 0.5 to 6 mm. prepared by heating crude dolomite containing as an inherent impurity $Al_2O_3$ and $Fe_2O_3$ in an amount of less than 1% by weight and silica to a temperature above about 1500° C., the silica being present in said sintered product in an amount of from 15 to 17%, and subjecting said stabilized sintered dolomite to treatment with water to hydraulically harden the same and a pore forming agent.

8. A process for removing dissolved impurities from aqueous liquids comprising passing such an impure aqueous liquid into and through a zone filled with a refining agent consisting essentially of a silica stabilized sintered dolomite, the CaO content of which is substantially completely chemically bound as a member selected from the group consisting of dicalcium silicate, tricalcium silicate and mixtures thereof prepared by heating crude dolomite and silica to a temperature above about 1500° C., the silica being present in said sintered product in an amount of from 15 to 17% where the CaO is present chemically bound as tri-calcium silicate and in an amount of about 22 to 25% where the CaO present is essentially bound as dicalcium silicate, whereby the impurity dissolved in said liquid is removed therefrom.

9. A process for removing dissolved impurities from aqueous liquids comprising adding to such an impure aqueous liquid refining agent consisting essentially of a silica stabilized sintered dolomite, the CaO content of which is substantially completely chemically bound as a member selected from the group consisting of dicalcium silicate, tricalcium silicate and mixtures thereof prepared by heating crude dolomite and silica to a temperature above about 1500° C., the silica being present in said sintered product in an amount of from 15 to 17% where the CaO is present chemically bound as tri-calcium silicate and in an amount of about 22 to 25% where the CaO present is essentially bound as dicalcium silicate, and thereafter separating the liquid from the refining agent.

10. A filter bed for removing dissolved impurities from an aqueous liquid, said filter bed consisting essentially of a bed of silica stabilized sintered dolomite, the CaO content of which is substantially completely chemically bound as a member selected from the group consisting of dicalcium silicate, tricalcium silicate and mixtures thereof in particle form prepared by heating crude dolomite containing as an inherent impurity $Al_2O_3$ and $Fe_2O_3$ in an amount of less than 1% by weight and silica to a temperature above about 1500° C., the silica being present in said sintered product in an amount of from 15 to 17% where the CaO is present chemically bound as tri-calcium silicate and in an amount of about 22 to 25% where the CaO present is essentially bound as dicalcium silicate, said silica stabilized sintered dolomite particles having a size of 0.2 to 15 mm.

References Cited by the Examiner

UNITED STATES PATENTS

| | | | |
|---|---|---|---|
| 1,994,377 | 3/1935 | Williams et al. | 106—61 X |
| 2,113,818 | 4/1938 | Sullivan | 106—61 |
| 2,207,557 | 7/1940 | Seil | 106—58 |
| 2,229,297 | 1/1941 | Lee | 106—59 |
| 2,317,961 | 4/1943 | Tschirner | 210—59 X |
| 2,343,151 | 2/1944 | MacIntire | 106—58 X |
| 2,358,107 | 9/1944 | Seil | 106—58 |
| 2,442,584 | 6/1948 | Calmon | 252—175 X |

MORRIS O. WOLK, *Primary Examiner.*

CARL F. KRAFFT, *Examiner.*